(12) United States Patent
Devota et al.

(10) Patent No.: US 10,946,812 B2
(45) Date of Patent: *Mar. 16, 2021

(54) METHOD OF ASSEMBLING VEHICULAR CAMERA WITH FASTENERLESS LENS ATTACHMENT

(71) Applicant: Magna Electronics Inc., Auburn Hills, MI (US)

(72) Inventors: Robert A. Devota, Durand, MI (US); Garret Achenbach, Rochester Hills, MI (US); David F. Olson, Lapeer, MI (US); Matthew C. Sesti, Williamston, MI (US); John R. Garcia, Montrose, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,812

(22) Filed: Feb. 3, 2020

(65) Prior Publication Data
US 2020/0172021 A1 Jun. 4, 2020

Related U.S. Application Data

(63) Continuation of application No. 16/225,080, filed on Dec. 19, 2018, now Pat. No. 10,549,702, which is a
(Continued)

(51) Int. Cl.
*H04N 7/18* (2006.01)
*B60R 11/04* (2006.01)
*B60R 11/00* (2006.01)

(52) U.S. Cl.
CPC ....... *B60R 11/04* (2013.01); *B60R 2011/0026* (2013.01)

(58) Field of Classification Search
CPC ...................................................... B60R 11/04
(Continued)

(56) References Cited

U.S. PATENT DOCUMENTS

| 4,634,884 A * | 1/1987 | Hayashimoto | H04N 5/349 250/208.1 |
| 5,204,615 A * | 4/1993 | Richards | G01R 31/2805 324/755.05 |

(Continued)

FOREIGN PATENT DOCUMENTS

| WO | 2013019795 A1 | 2/2013 |
| WO | 2013123161 A1 | 8/2013 |

*Primary Examiner* — Leron Beck
(74) *Attorney, Agent, or Firm* — Honigman LLP

(57) ABSTRACT

A method for assembling a vehicular camera module includes providing an imager circuit board and a lens holder. The lens holder includes a lens holding portion and an attaching portion, with the lens holding portion accommodating a lens. The attaching portion of the lens holder includes pins that, when the attaching portion is located at the imager circuit board, are received at least partially through apertures of the imager circuit board. With the pins received at least partially through the apertures, the lens holder is laterally adjusted relative to the imager circuit board and the pins are soldered at the imager circuit board so as to attach the lens holder at the imager circuit board to form an imager assembly. The imager assembly is attached at a camera housing, and a processing circuit board is accommodated at the camera housing and electrically connected to the imager circuit board.

20 Claims, 16 Drawing Sheets

Related U.S. Application Data continuation of application No. 14/258,366, filed on Apr. 22, 2014, now abandoned.

(60) Provisional application No. 61/918,290, filed on Dec. 19, 2013, provisional application No. 61/875,351, filed on Sep. 9, 2013, provisional application No. 61/823,644, filed on May 15, 2013, provisional application No. 61/815,044, filed on Apr. 23, 2013.

(58) Field of Classification Search
USPC ........................................................ 348/148
See application file for complete search history.

(56) References Cited

U.S. PATENT DOCUMENTS

| | | | |
|---|---|---|---|
| 5,506,629 A * | 4/1996 | Kawahara | H04N 9/31 |
| | | | 348/776 |
| 5,537,169 A * | 7/1996 | Park | H04N 9/3105 |
| | | | 348/E5.143 |
| 5,550,677 A | 8/1996 | Schofield et al. | |
| 5,670,935 A | 9/1997 | Schofield et al. | |
| 5,734,428 A * | 3/1998 | Suda | G03B 13/02 |
| | | | 348/333.02 |
| 5,949,331 A | 9/1999 | Schofield et al. | |
| 6,087,953 A | 7/2000 | DeLine et al. | |
| 6,097,023 A | 8/2000 | Schofield et al. | |
| 6,172,613 B1 | 1/2001 | DeLine et al. | |
| 6,243,003 B1 | 6/2001 | DeLine et al. | |
| 6,250,148 B1 | 6/2001 | Lynam | |
| 6,278,377 B1 | 8/2001 | DeLine et al. | |
| 6,326,613 B1 | 12/2001 | Heslin et al. | |
| 6,329,925 B1 | 12/2001 | Skiver et al. | |
| 6,341,523 B2 | 1/2002 | Lynam | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,501,387 B2 | 12/2002 | Skiver et al. | |
| 6,593,565 B2 | 7/2003 | Heslin et al. | |
| 6,690,268 B2 | 2/2004 | Schofield et al. | |
| 6,824,281 B2 * | 11/2004 | Schofield | B60R 11/04 |
| | | | 359/876 |
| 6,968,736 B2 | 11/2005 | Lynam | |
| 7,004,593 B2 | 2/2006 | Weller et al. | |
| 7,188,963 B2 | 3/2007 | Schofield et al. | |
| 7,289,037 B2 | 10/2007 | Uken et al. | |
| 7,339,149 B1 | 3/2008 | Schofield et al. | |
| 7,344,261 B2 | 3/2008 | Schofield et al. | |
| 7,423,248 B2 | 9/2008 | Schofield et al. | |
| 7,459,664 B2 | 12/2008 | Schofield et al. | |
| 7,480,149 B2 * | 1/2009 | DeWard | B60R 11/04 |
| | | | 340/438 |
| 7,655,894 B2 | 2/2010 | Schofield et al. | |
| 7,946,505 B2 | 5/2011 | Lynam et al. | |
| 7,965,336 B2 | 6/2011 | Bingle et al. | |
| 7,994,462 B2 | 8/2011 | Schofield et al. | |
| 8,203,440 B2 | 6/2012 | Schofield et al. | |
| 8,222,588 B2 | 7/2012 | Schofield et al. | |
| 8,256,821 B2 | 9/2012 | Lawlor et al. | |
| 8,314,689 B2 | 11/2012 | Schofield et al. | |
| 8,324,552 B2 | 12/2012 | Schofield et al. | |
| 8,405,726 B2 | 3/2013 | Schofield et al. | |
| 8,451,332 B2 | 5/2013 | Rawlings | |
| 10,549,702 B2 | 2/2020 | Devota et al. | |
| 2006/0050018 A1 | 3/2006 | Hutzel et al. | |
| 2006/0103727 A1* | 5/2006 | Tseng | B60R 1/00 |
| | | | 348/148 |
| 2009/0295181 A1* | 12/2009 | Lawlor | B60R 11/04 |
| | | | 296/1.11 |
| 2014/0160284 A1 | 6/2014 | Achenbach et al. | |
| 2014/0313337 A1 | 10/2014 | Devota et al. | |
| 2015/0124098 A1 | 5/2015 | Winden et al. | |

\* cited by examiner

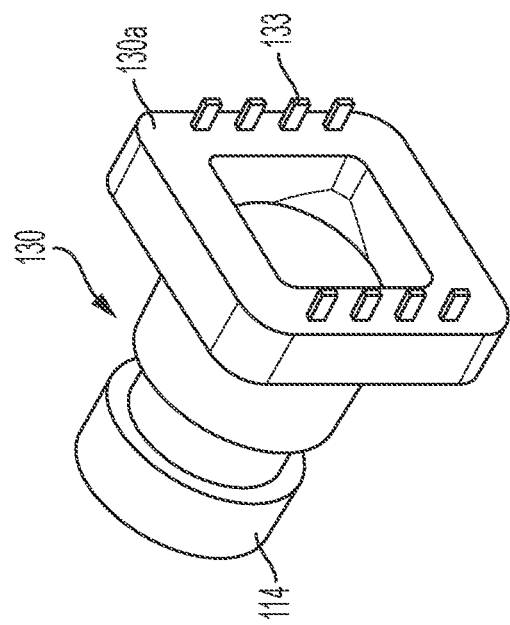
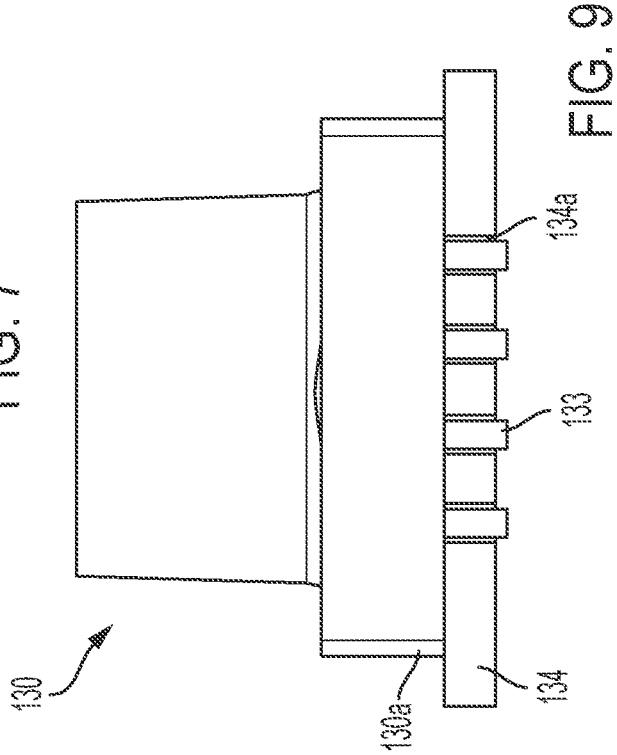
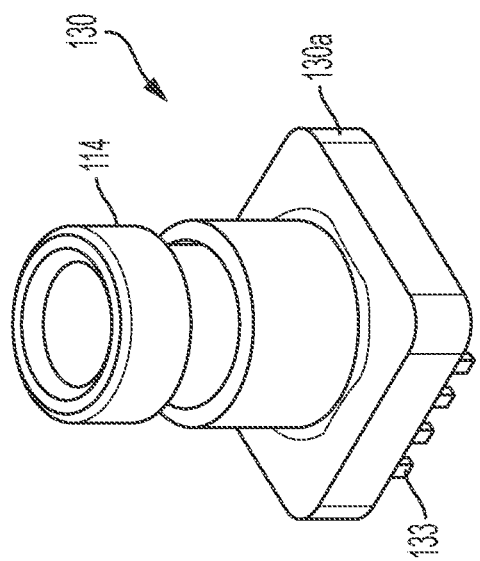# 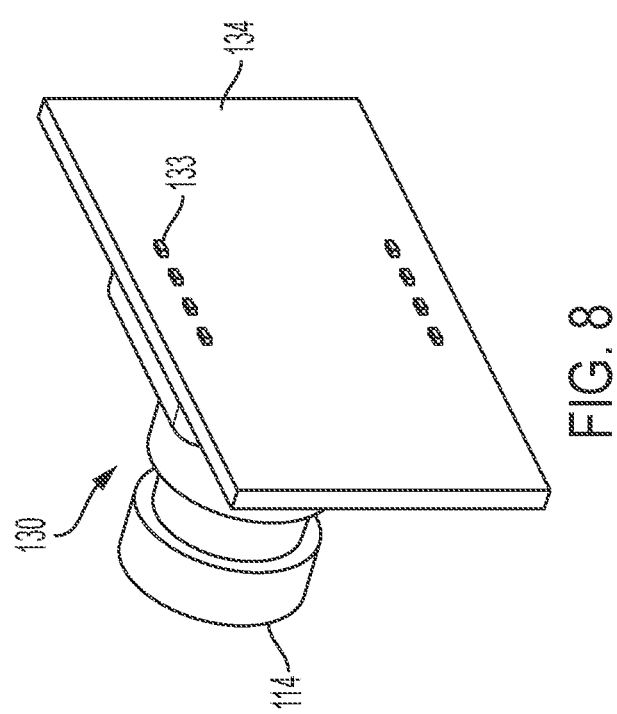

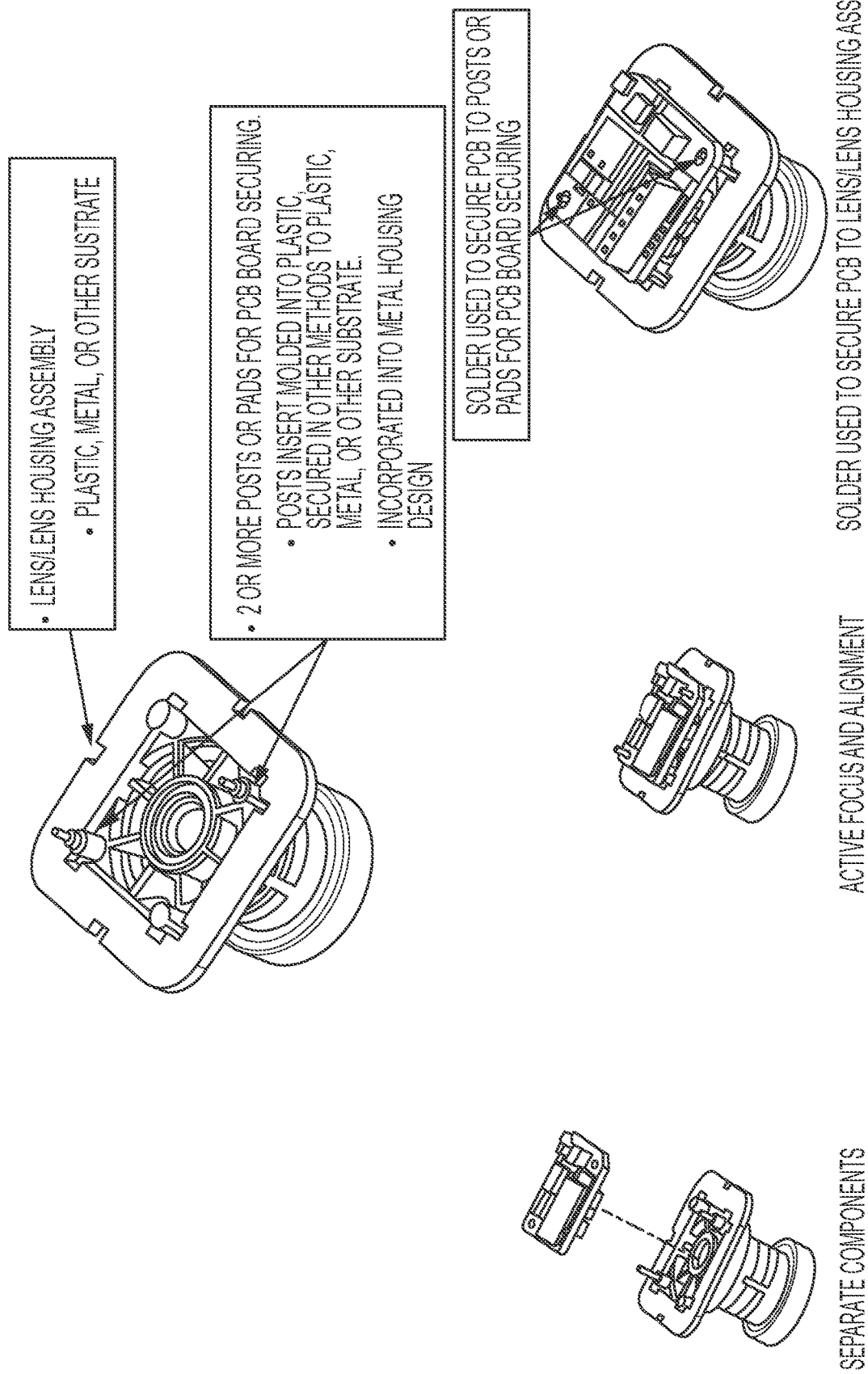

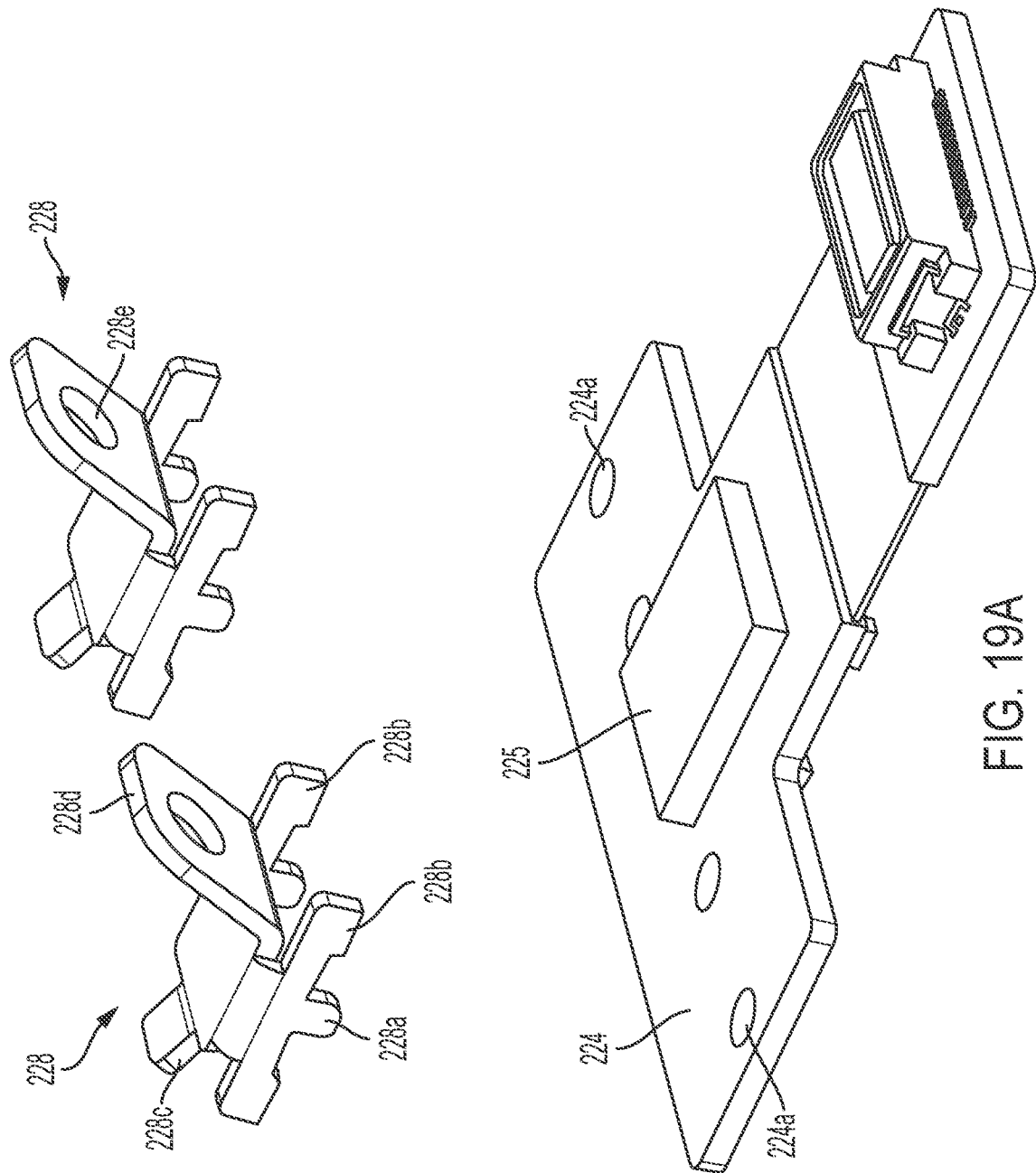

METHOD OF ASSEMBLING VEHICULAR CAMERA WITH FASTENERLESS LENS ATTACHMENT

CROSS REFERENCE TO RELATED APPLICATIONS

The present application is a continuation of U.S. patent application Ser. No. 16/225,080, filed Dec. 19, 2018, now U.S. Pat. No. 10,549,702, which is a continuation of U.S. patent application Ser. No. 14/258,366, filed Apr. 22, 2014, which claims the filing benefits of U.S. provisional applications, Ser. No. 61/918,290, filed Dec. 19, 2013, Ser. No. 61/875,351, filed Sep. 9, 2013, Ser. No. 61/823,644, filed May 15, 2013, and Ser. No. 61/815,044, filed Apr. 23, 2013, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 8,324,552; 8,314,689; 8,222,588; 8,203,440; 7,994,462; 7,655,894; 7,339,149; 7,344,261; 7,459,664; 7,423,248; 6,097,023; 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, which may be displayed or processed to provide the desired display images and/or processing and control, depending on the particular application of the camera and vision or imaging system. The present invention provides a camera module that houses an imager and lens holder and lens at the windshield of vehicle. The lens holder comprises enhanced attachment means or elements that attach the lens holder at the imager circuit board to mount the lens at the imager. Optionally, the lens may attach at the imager circuit board without use of a lens holder. The present invention provides a fastenerless surface mount or surface attachment of the lens or lens holder to the imager circuit board without use of additional or separate fasteners or screws. Optionally, the present invention provides a solder attachment of the imager circuit board to a housing of the camera.

These and other objects, advantages, purposes and features of the present invention will become apparent upon review of the following specification in conjunction with the drawings.

BRIEF DESCRIPTION OF THE DRAWINGS

The drawings illustrate, by way of example only, embodiments of the present disclosure.

FIG. 6 is a perspective view of a lens holder of an image module of the present invention;

FIG. 7 is another perspective view of the lens holder of FIG. 6;

FIG. 8 is a perspective view of the lens holder of FIGS. 6 and 7, shown attached at a circuit board in accordance with the present invention;

FIG. 9 is a side elevation and partial sectional view of the lens holder and circuit board assembly of FIG. 8;

FIG. 14 are views of the lens holder and circuit board, showing the assembly process of the present invention;

FIGS. 19A-C are exploded perspective views of the circuit element and case mounts of the imager assembly of the present invention, showing the attachment process of the case mounts to the circuit element;

DESCRIPTION OF THE PREFERRED EMBODIMENTS

Figure 1:
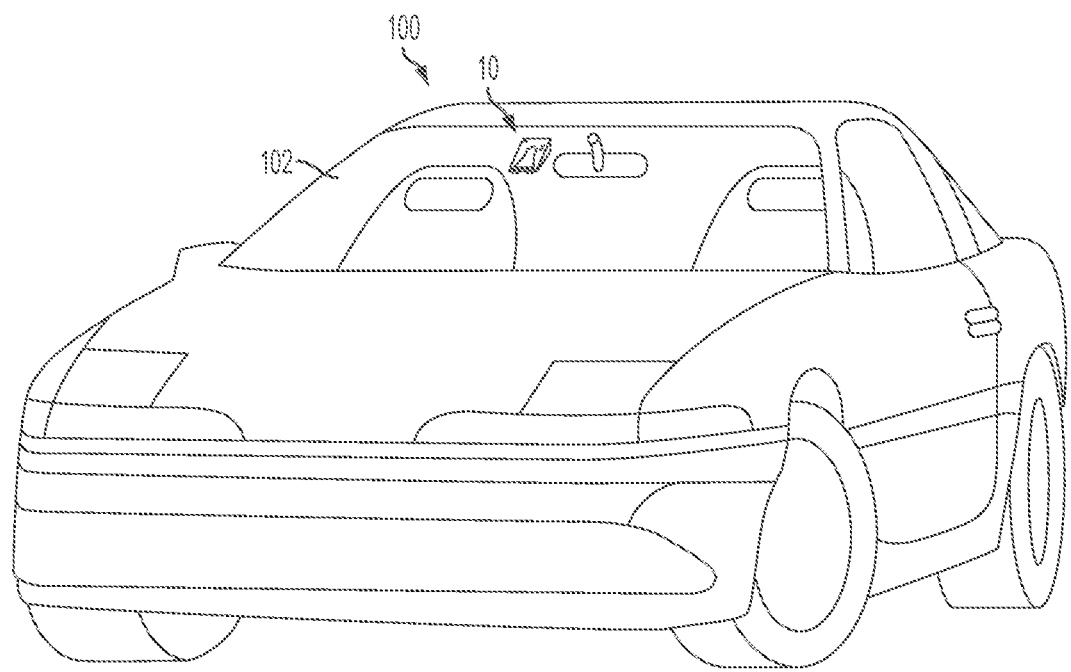
FIG. 1 is a perspective view of a vehicle having a vehicular camera system.
Figure 2:
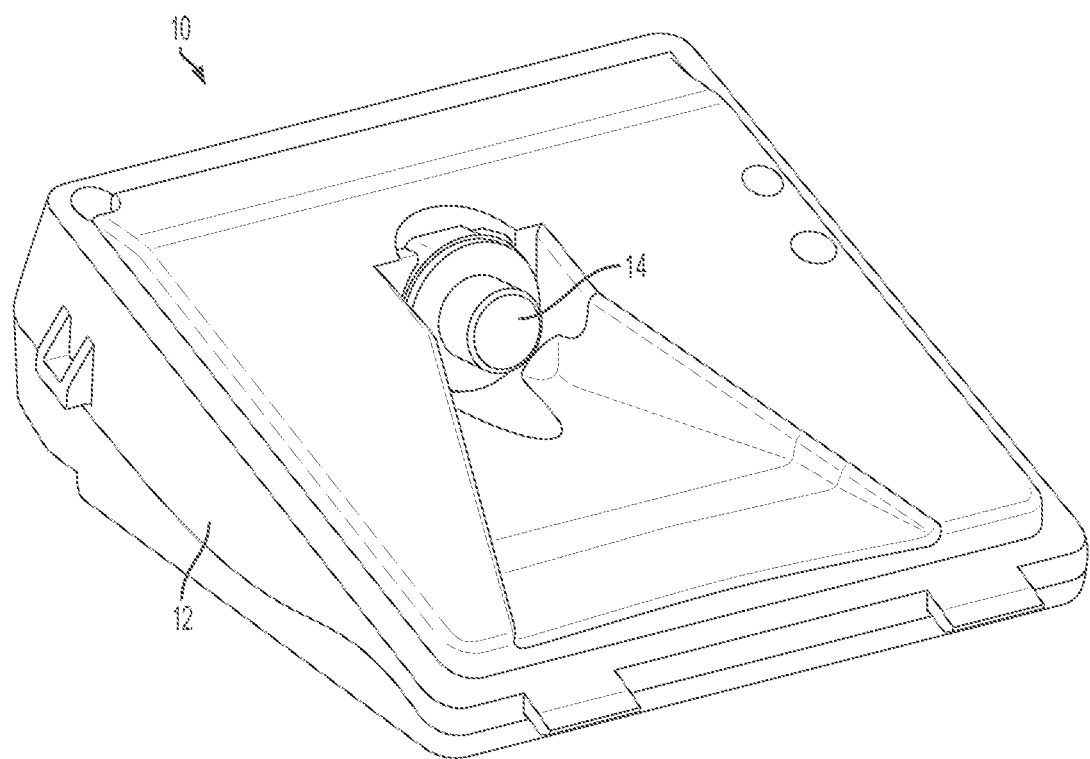
FIG. 2 is a perspective view of a forward facing imager module of the vehicular camera system.

A vehicular camera system can be installed on the inside of the front windshield of a vehicle, such as a car, truck, bus, or van. Such a camera system may be used for a variety of functions such as object detection, lane keeping, and high beam control. FIGS. 1 and 2 show an example of a vehicular camera system or module 10 configured to be attached in a front-facing manner to a vehicle 100. The camera system 10 includes a housing 12 and a lens 14 having a lens barrel projecting therefrom.

FIG. 1 shows a forward-facing position for a camera system 10 in the vehicle 100. The camera system or module 10 can be attached to the windshield 102, as shown, such as via a frame or bracket that is adhesively attached at the windshield via a plurality of fixing elements or attachment elements. Other positions are also possible. The camera system or camera module of the present invention may utilize aspects of the systems and/or modules described in U.S. provisional applications, Ser. No. 61/905,462, filed Nov. 18, 2013, and Ser. No. 61/901,127, filed Nov. 7, 2013, and/or PCT Application No. PCT/US2013/026101, filed Feb. 14, 2013, and/or PCT Application No. PCT/US2012/048993, filed Jul. 31, 2012 and published Feb. 7, 2013 as International Publication No. WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication No. US-2009-0295181, which are all hereby incorporated herein by reference in their entireties.

Figure 3:
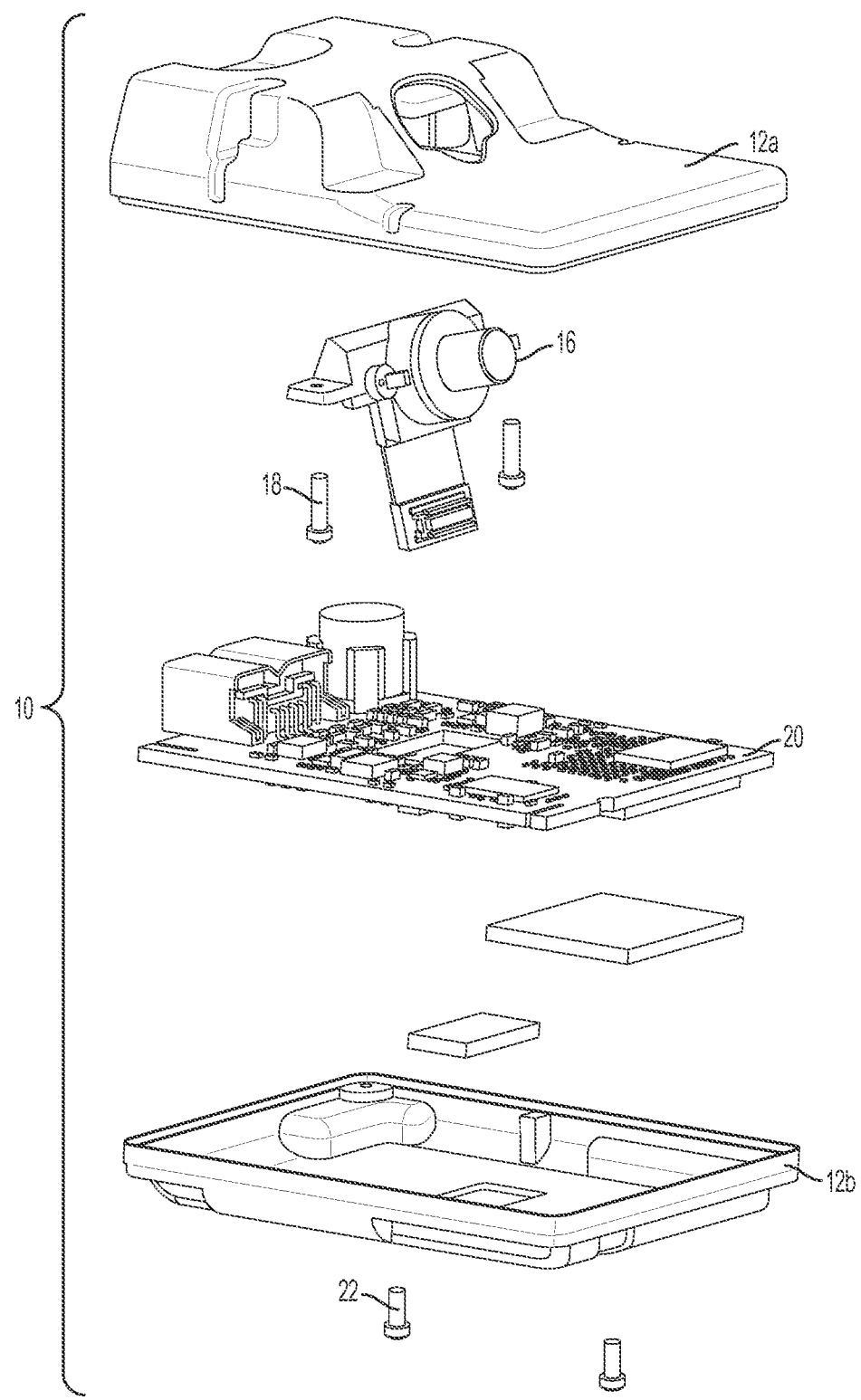
FIG. 3 is an exploded view of the forward facing imager module.

As shown in FIG. 3, the automotive camera system 10 comprises a lens holder assembly 16 which is connected by screws 18 to an upper cover 12a. A processing board 20 is provided which comprises an image processor. The camera system is closed by lower cover 12b, which is connected to the upper cover by fasteners or screws 22. In the illustrated embodiment, the camera is part of a forward camera module that views forwardly through a windshield of a vehicle. However, although shown and described above as being suitable for use with a forward facing camera and camera module of a vehicle, the cameras and lenses and imagers and the focusing and alignment and attachment processes and means described herein are suitable for use in other vehicle cameras, such as interior viewing cameras and/or other exterior viewing cameras or camera modules, such as rear backup cameras or side view cameras or exterior viewing cameras for a surround view system or the like.

Figure 4:
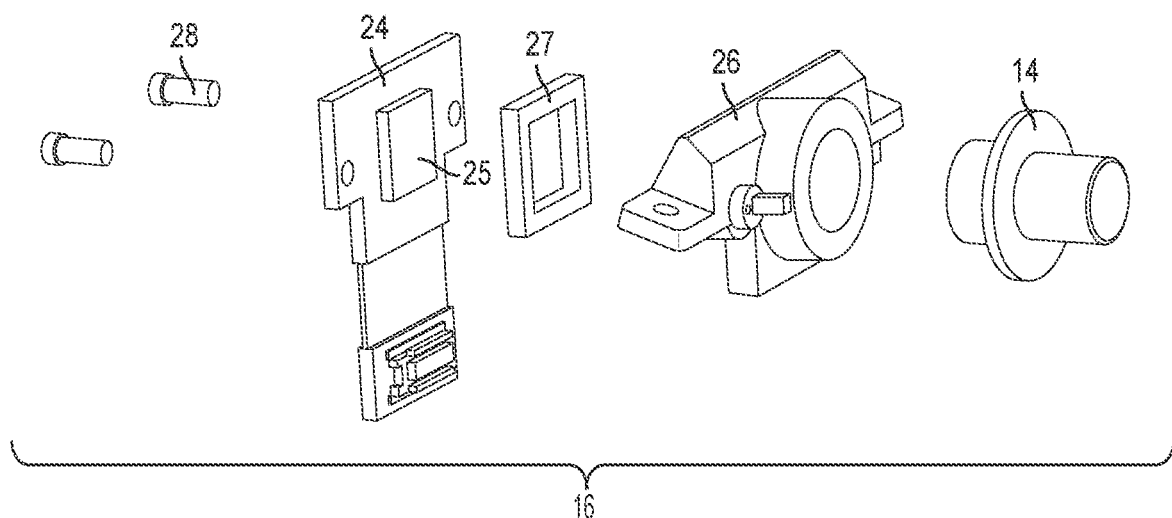
FIG. 4 is an exploded view of the imager assembly.

The lens holder assembly 16 is shown in more detail in FIG. 4. In the illustrated embodiment, the lens holder assembly comprises an imager circuit element or printed circuit board (PCB) 24 at which an image sensor 25 is disposed, such as via soldering of the imager onto the PCB. Image sensor 25 and imager PCB 24 are operatively connected to the processing board or main circuit board 20, such as via a flexible ribbon cable or other suitable electrical connector. The imager PCB 24 is mounted to lens holder 26 by two fasteners or screws 28. Lens 14 is attached (such as via adhesive) to lens holder 26 such that the lens is focused and aligned relative to image sensor 25 when the lens and lens holder are secured relative to the imager PCB.

The lens holder assembly 16 as described requires an assembly step of attaching the lens holder 26 to the imager PCB 24, such as by fasteners or fastening screws 28 or the like. This attachment step requires time and separate additional fasteners and thus adds to the assembly process and cost. Additionally, a gasket 27 may be required to seal the image sensor 25 from dust and stray light.

Figure 5:
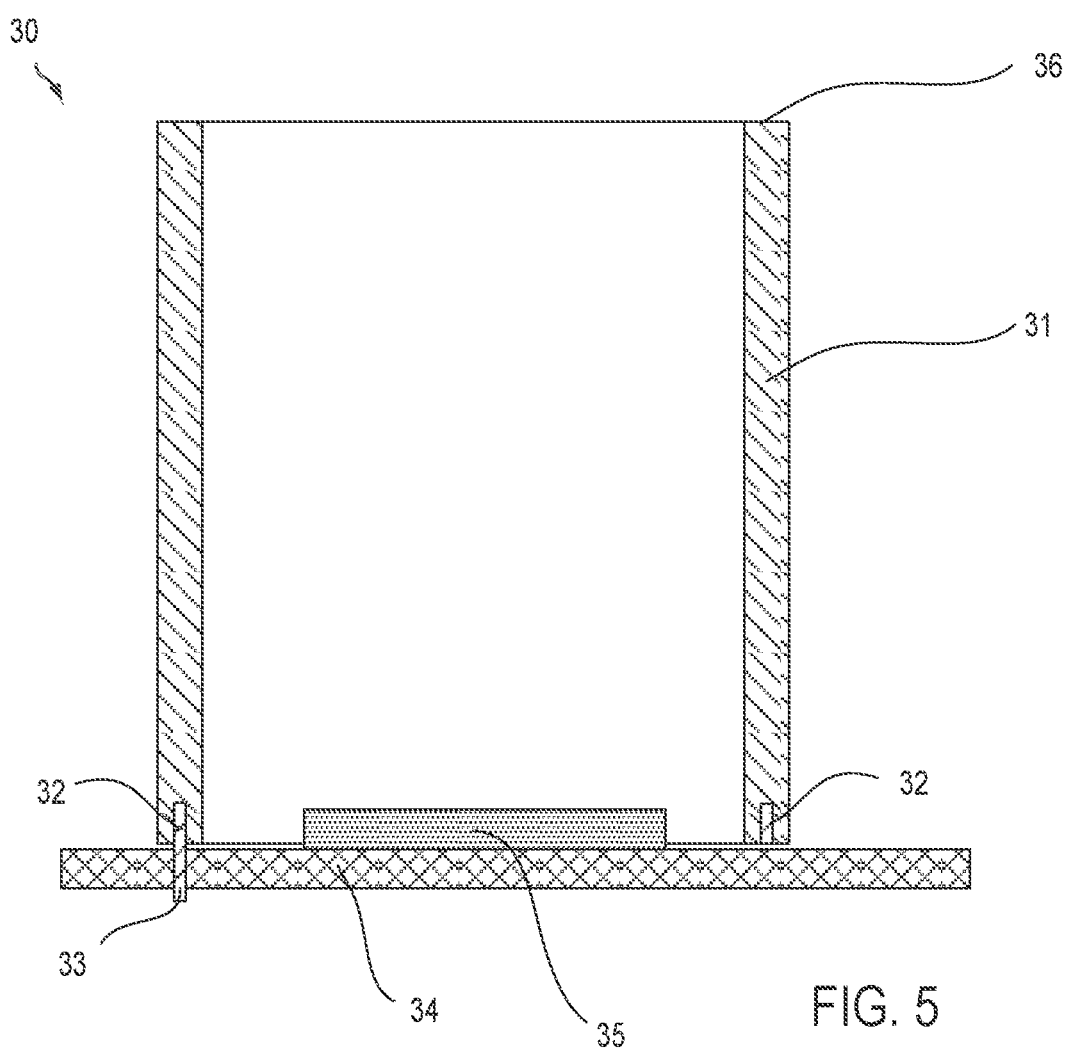
FIG. 5 is a sectional view of a lens holder attached at an imager circuit board in accordance with the present invention.
Figure 11:
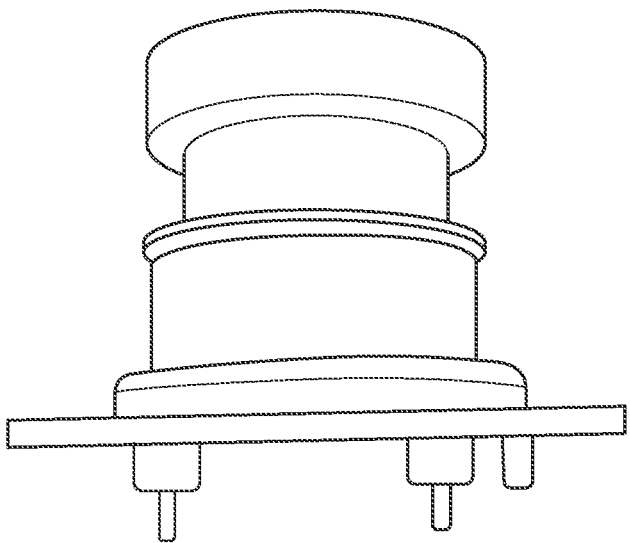
FIG. 11 is a side view of the lens holder and lens assembly of FIG. 10.
Figure 10:
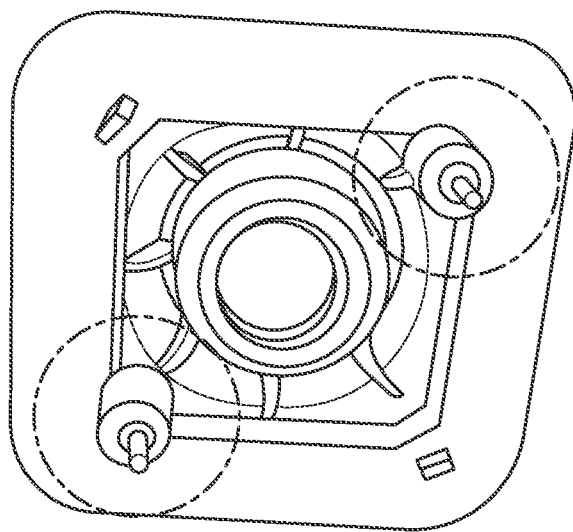
FIG. 10 is a perspective view of a lens holder and lens assembly, shown with posts attached at the lens holder for attaching the circuit board at the lens holder in accordance with the present invention.
Figure 13:
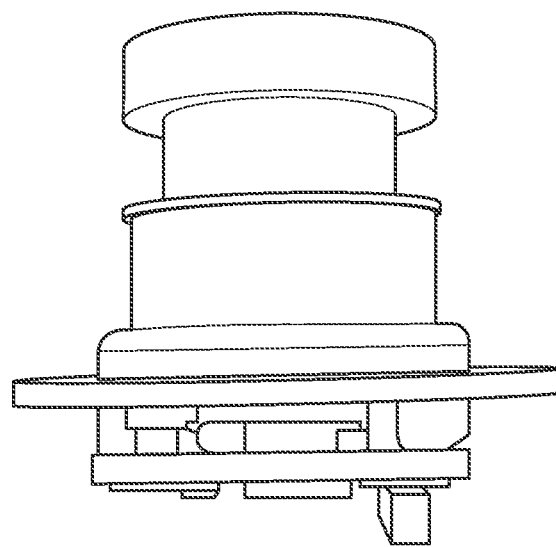
FIG. 13 is a side view of the lens holder and circuit board construction of FIG. 12.
Figure 12:
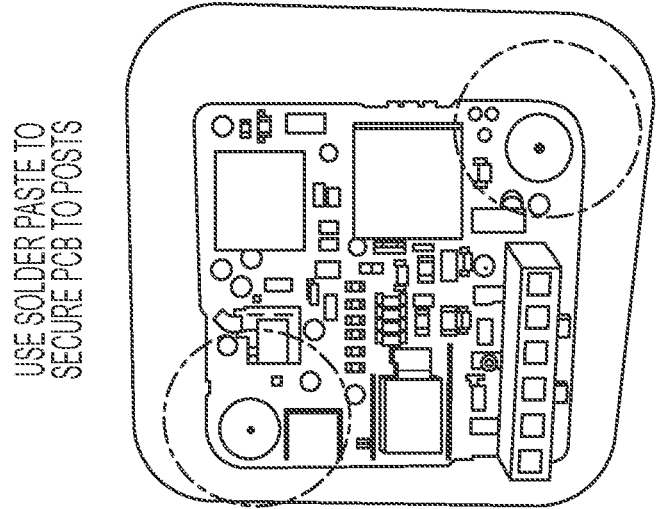
FIG. 12 is a view similar to FIG. 10, shown with the circuit board soldered at the posts after the lens is focused and aligned with the imager of the circuit board in accordance with the present invention.
Figure 16:
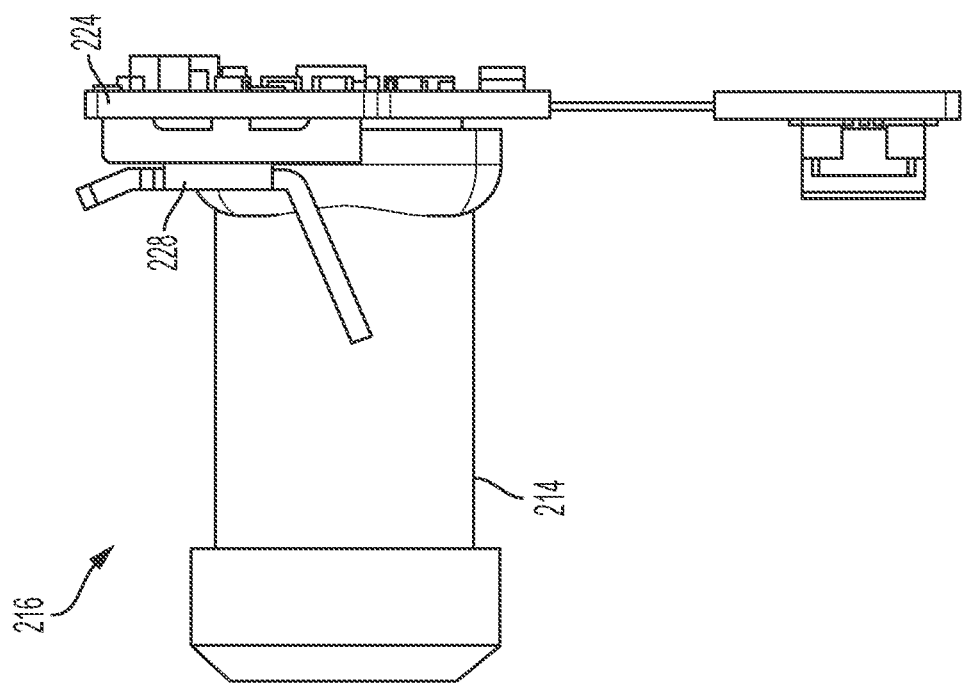
FIG. 16 is a side elevation of the imager assembly of FIG. 15.
Figure 15:
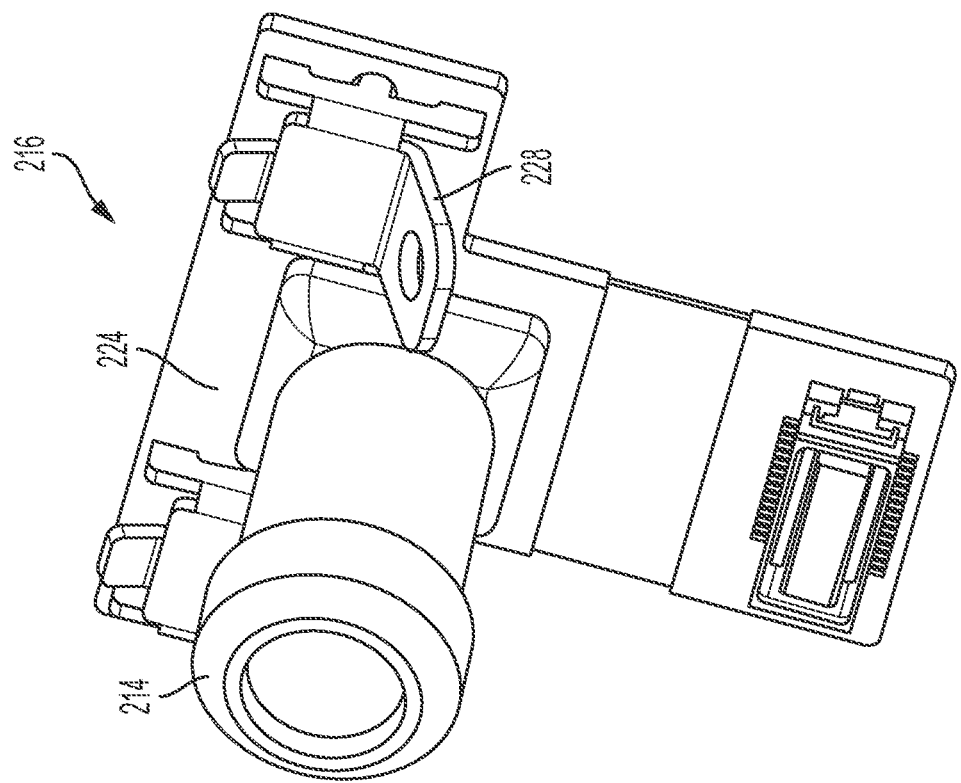
FIG. 15 is a perspective view of another imager assembly of a camera module of the present invention.
Figure 18:
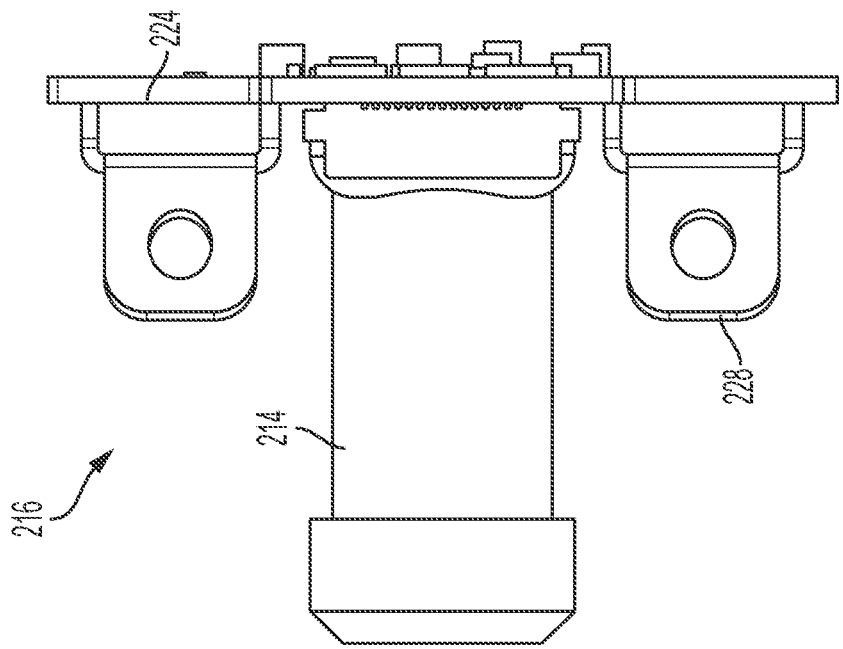
FIG. 18 is an end elevation of the imager assembly of FIG. 15.
Figure 17:
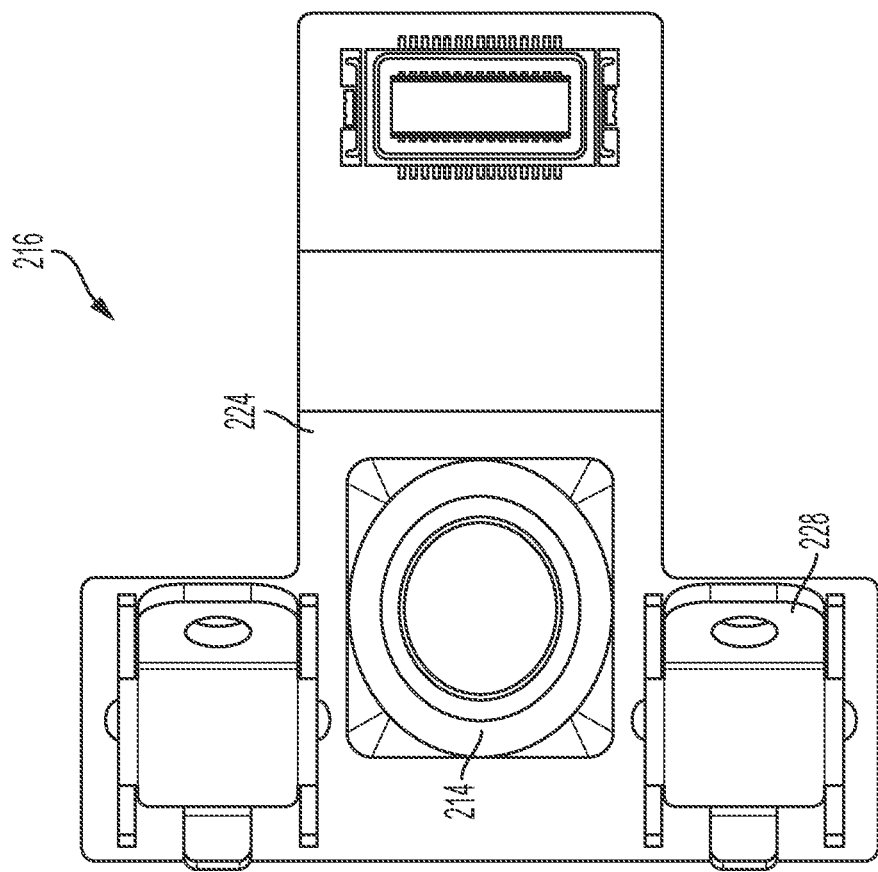
FIG. 17 is a plan view of the imager assembly of FIG. 15.
Figure 19B:
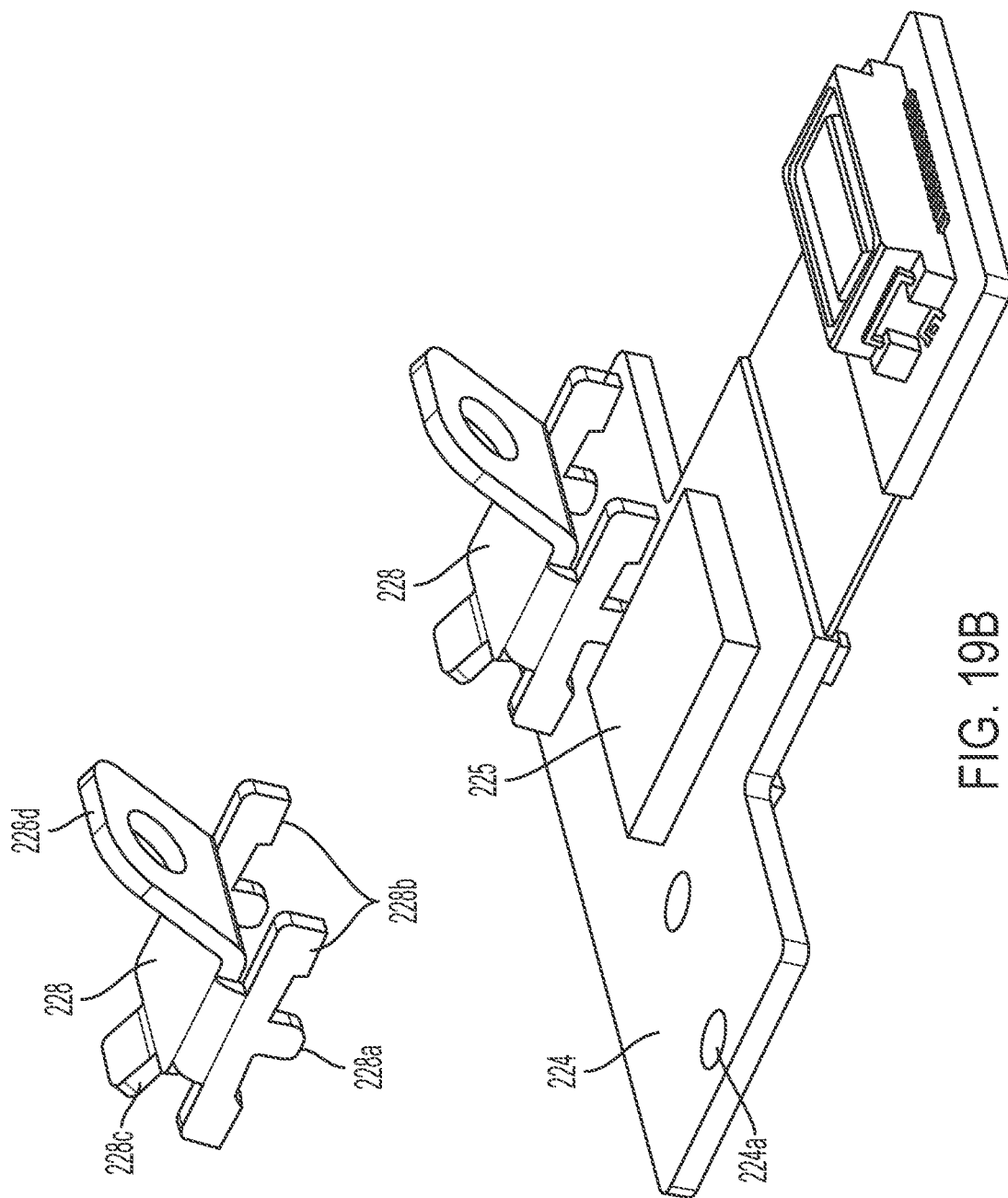
Figure 19C:
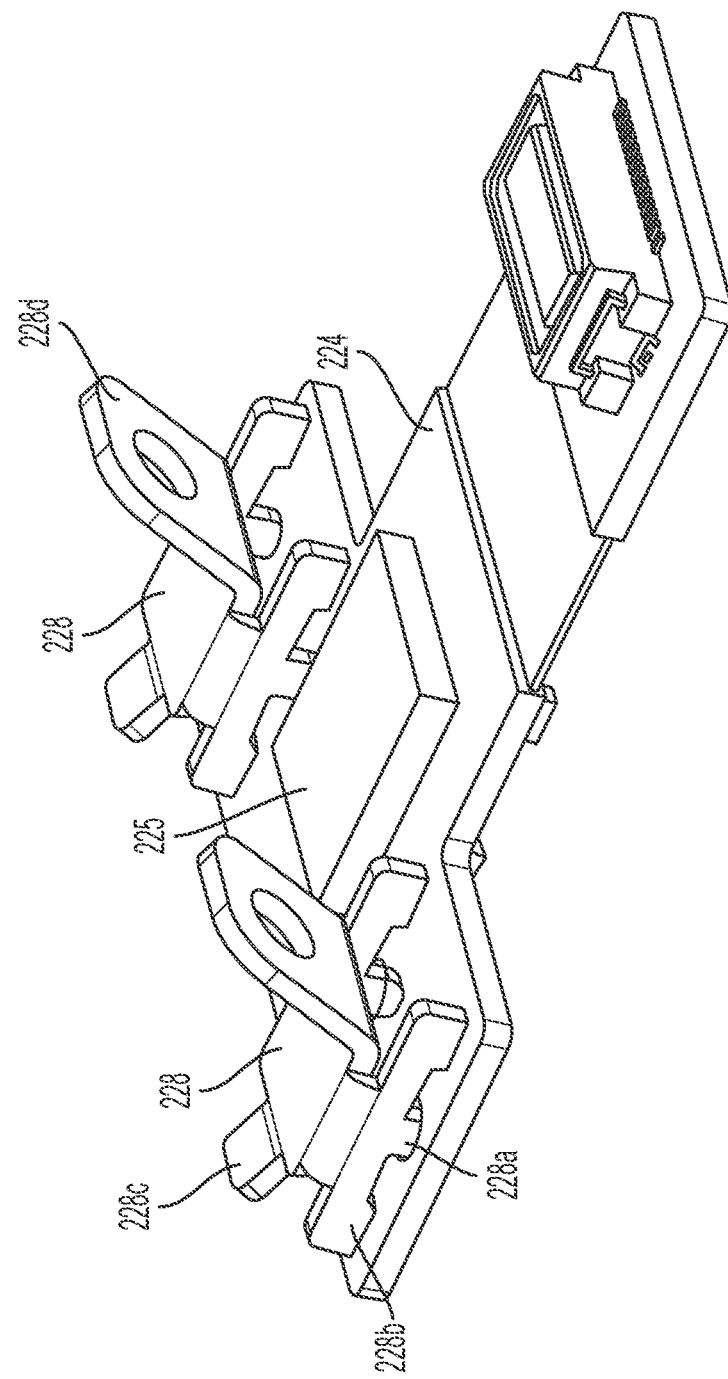
Figure 20:
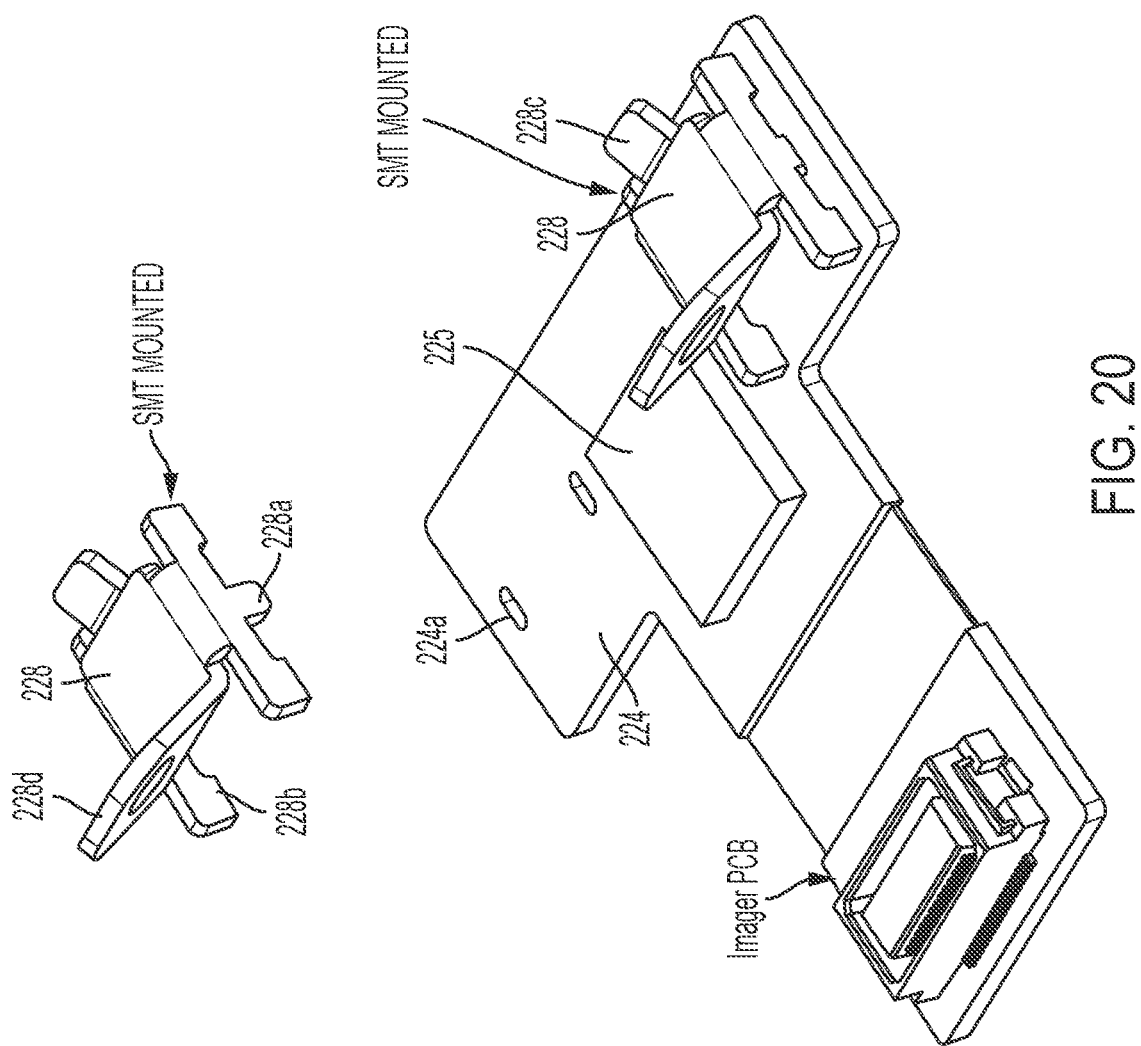
FIG. 20 is another exploded perspective view of the circuit element and case mounts, showing one of the case mounts attached at the circuit element.

The present invention provides an improved lens holder 30, which is shown in FIG. 5. Lens holder 30 comprises a generally cylindrical plastic lens retaining element or member 31 having a surface or end or end region 36 configured for attaching the lens thereat. The lens may be attached via any suitable manner, and is preferably adhered or bonded or glued to surface 36 with an UV-curable adhesive. At least one and preferably two or more retaining elements or metal inserts 32 is/are insert molded into the plastic lens retaining member 31 (such as via injection molding of the lens retaining member about the metal insert to insert mold the pin or insert into the lens retaining member). Each metal insert 32 includes a pin portion or end portion 33 that extends from the end or bottom or engaging portion of the lens retaining member and is received through a corresponding aperture or recess established at or through the imager PCB 34, whereby the pins are disposed at and may be soldered onto the imager PCB 34 (such as via soldering the pins at the back surface of the PCB opposite the surface where the imager is disposed or established, such as via standard soldering techniques of the likes used to solder the circuitry at the PCB). Thus, lens holder 30 is placed at the imager PCB 34 as a surface-mount component after the image sensor 35 has been placed onto or established at the imager PCB 34. For example, the pins or ends 33 of the metal inserts 32 may be aligned with respective holes or apertures or recesses formed at or in or through the imager PCB and the ends of the pins that protrude through the back side or other side of the PCB may be soldered at the imager PCB to secure the lens holder relative to the PCB. The PCB and lens holder assembly may then be conveyed into and through an oven (that heats the assembly to solder and secure the circuitry at the PCB) and the pins (and lens holder) are soldered in place relative to the PCB.

As illustrated, the pins 33 may utilize "pin in paste" soldering and engage or receive or insert into the apertures in the PCB, whereby the ends 33 of the pins that protrude through the imager PCB may be soldered at the PCB to connect the lens retaining member 31 of lens holder 30 to the imager PCB 34. Optionally, in an alternative embodiment, the pins 33 may be angled and soldered onto pads on the imager PCB 34 so as to not require holes in or through the imager PCB 34.

Optionally, the lens retaining member 31 may be plated at its lower or PCB engaging end and then placed at a solder paste established on the imager side of the PCB. Then, when the lens retaining member 31 is placed at the PCB 34 and heated, it is soldered in place. After the lens retaining member or barrel is affixed at the imager PCB (either via the pins or plated end or the like), the lens is then placed and/or adjusted or set to actively align the lens with the imager.

The metal insert or retaining element of the lens holder may comprise any suitable configuration and may comprise a pin 33 or pins that protrude from the lens retaining member and are received into holes or apertures at or through the imager PCB when the lens holder is attached at the imager PCB. The lens retaining member thus may be "plugged" into the imager PCB and soldered or otherwise affixed thereat. Optionally, the lens retaining member may comprise apertures or hollow receivers that receive pins that protrude from the imager PCB, whereby the pins may be soldered at the PCB and, after they are received in the apertures of the lens retaining member, may be soldered or bonded or otherwise affixed at the lens retaining member. Optionally, the PCB or the lens retaining member may comprise an annular channel (such as a metallic annular shaped channel element that may be insert molded into the end of the lens holder) that receives a plurality of pins of the lens retaining member or the imager PCB therein at different locations around the circumference of the lens holder when the lens holder is disposed at and/or attached at the imager PCB. The various metal inserts or pins are configured to engage the PCB or protrude through the PCB or engage pins attached at the PCB, whereby the metal inserts are soldered at the PCB to affix the lens retaining member relative to the PCB.

Optionally, the plastic lens retaining member 31 preferably comprises an attachment feature (not shown) for mounting the lens holder assembly (comprising the lens 14, lens holder 30 and imager PCB 34) to a cover (such as to upper cover 12a, discussed above). The imager PCB 34 may then be held only by solder joints which connect pins 33 with the imager PCB 34.

Optionally, and with reference to FIGS. 6-9, a lens holder 130 (for holding a lens 114) includes a base or attaching portion 130a with a plurality of pins or elements 133 extending therefrom for attaching the lens holder 130 to a circuit board or PCB 134. In the illustrated embodiment, the pins 133 are arranged along opposite perimeter regions of a generally square-shaped or rectangular-shaped base 130a, and are received in correspondingly formed and arranged holes or apertures 134a of the circuit board 134. Thus, when the lens holder 130 is mounted at the circuit board 134, the pins 133 are received through the apertures 134a of the circuit board 134, so that the pins protrude slightly from the opposite side of the circuit board (such as shown in FIGS. 8 and 9). The pins 133 may then be soldered or otherwise retained at the opposite side of the circuit board 134 from the lens and lens holder, and the solder may be applied and melted and cured during the application, melting and curing of the solder of the circuitry of the circuit board.

Thus, the present invention provides a lens holder that has an enhanced attachment at the imager PCB, thus providing a reduced cost and reduced processing assembly of the lens and imager and PCB. The lens holder attachment configuration of the present invention includes retaining elements that are insert molded into a plastic lens holding element or member and that comprise pins or retaining elements that engage and/or protrude through the imager PCB and that are soldered thereat to secure or retain or attach the lens holder at the imager PCB, without use of fasteners or screws. The present invention thus provides a fastenerless surface mount or surface attachment of the lens holder to the imager circuit board without use of additional or separate fasteners or screws. Thus, the present invention provides a camera assembly for a forward facing camera module of a vehicle that has fewer components and is easier to assemble.

Optionally, and as shown in FIGS. 10-14, the posts or pins may be adhered at the lens housing or lens holder, such as via any suitable adhesive, and the circuit board may be soldered at the pins to attach the circuit board to the pins or posts and to the lens housing or lens holder. The circuit board may initially receive the pins or posts through apertures at perimeter regions of the circuit board (such as at the corners as shown in FIGS. 10-14, or any other suitable location around or along a periphery of the circuit board and/or lens holder or housing). The apertures of the circuit board may be slightly oversized relative to the diameter of the pins, so that when the pins are received through the apertures of the circuit board, the circuit board is laterally adjustable relative to the lens to allow for alignment and focusing of the lens at the imager of the circuit board. After the lens is brought into alignment and focus with the imager, the pins may be soldered to the circuit board to hold the lens in focus and alignment with the imager.

The lens or lens housing or assembly thus may have two or more pins or posts or pads for the PCB attachment or securement. The posts may be insert molded into the plastic housing or may be otherwise secured to the plastic housing (or to a metal housing or other substrate or material, depending on the camera application). Optionally, for a metallic lens housing or holder, the pins or posts may be incorporated into the housing design and formed with or as part of the metallic housing.

As can be seen with reference to FIG. 14, the lens assembly (with posts protruding therefrom) and the circuit board may be provided as separate components and may be moved to an active focus and alignment processing area of the manufacturing facility where the cameras are manufactured and assembled. With the pins received through the apertures in the circuit board, the lens and circuit board are adjusted relative to one another to actively focus and align the lens with the imager or imaging array of the circuit board. When the lens and imager are aligned, solder is used to secure the posts at the circuit board and thus to secure the circuit board and imager relative to the lens housing and lens assembly, so as to maintain the alignment and focus of the lens relative to the imager of the circuit board. The solder may be applied before or during the aligning and focusing process, whereby the solder is heated and is pliable during the process and is cured or cooled and hardened after the lens is aligned and focused to the imager, or the solder may be applied after the lens is aligned and focused to the imager, whereby the lens and circuit board are fixture or held during the solder application and cooling and hardening process, while remaining within the spirit and scope of the present invention.

Optionally, the lens assembly of the lens barrel may be attached or adhered directly to the circuit board, thereby obviating the need for the lens holder. For example, and with reference to FIGS. 15-22, an imager assembly 216 includes an imager circuit element or printed circuit board (PCB) 224 at which an image sensor 225 (FIGS. 19A-21), is disposed, such as via soldering of the imager onto the PCB. Image sensor 225 and imager PCB 224 are operatively connected to the processing board or main circuit board, such as via a flexible ribbon cable or other suitable electrical connector. The lens assembly or lens or lens barrel 214 is attached at the PCB 224, without an additional lens holder, with the imager assembly 216 including a pair of case mounts or clips 228 for attaching the imager assembly to the camera housing (such as a camera housing similar to covers 12a, 12b of FIG. 3).

In the illustrated embodiment, the imager PCB 224 includes a pair of apertures or holes 224a at either side of the image sensor 225 (but they could be located elsewhere at the PCB) for receiving tabs 228a of the clips 228 to position the clips at the appropriate or selected or designed location at the PCB 224. The clips 228 also include attachment tabs or pads 228b that engage or contact solder pads or the like at the PCB 224 when the tabs 228a are received in the holes 224a of the PCB 224. Thus, and as can be seen with reference to FIGS. 19A-C and 20, the clips 228 may be positioned at the PCB and located thereat via insertion of the tabs 228a into the holes 224a, whereby the clips may be secured at or to the PCB, such as via soldering the tabs 228b at the solder pads at the PCB 224. In the illustrated embodiment, the clips 228 include a pair of attachment portions or arms, each having a guide tab 228a and a pair of solder tabs 228b, but other attachment configurations may be achieved while remaining within the spirit and scope of the present invention. For example, two or more tabs or posts of the clips may be inserted through holes and soldered thereat, such as via the soldering means discussed above.

Figure 21:
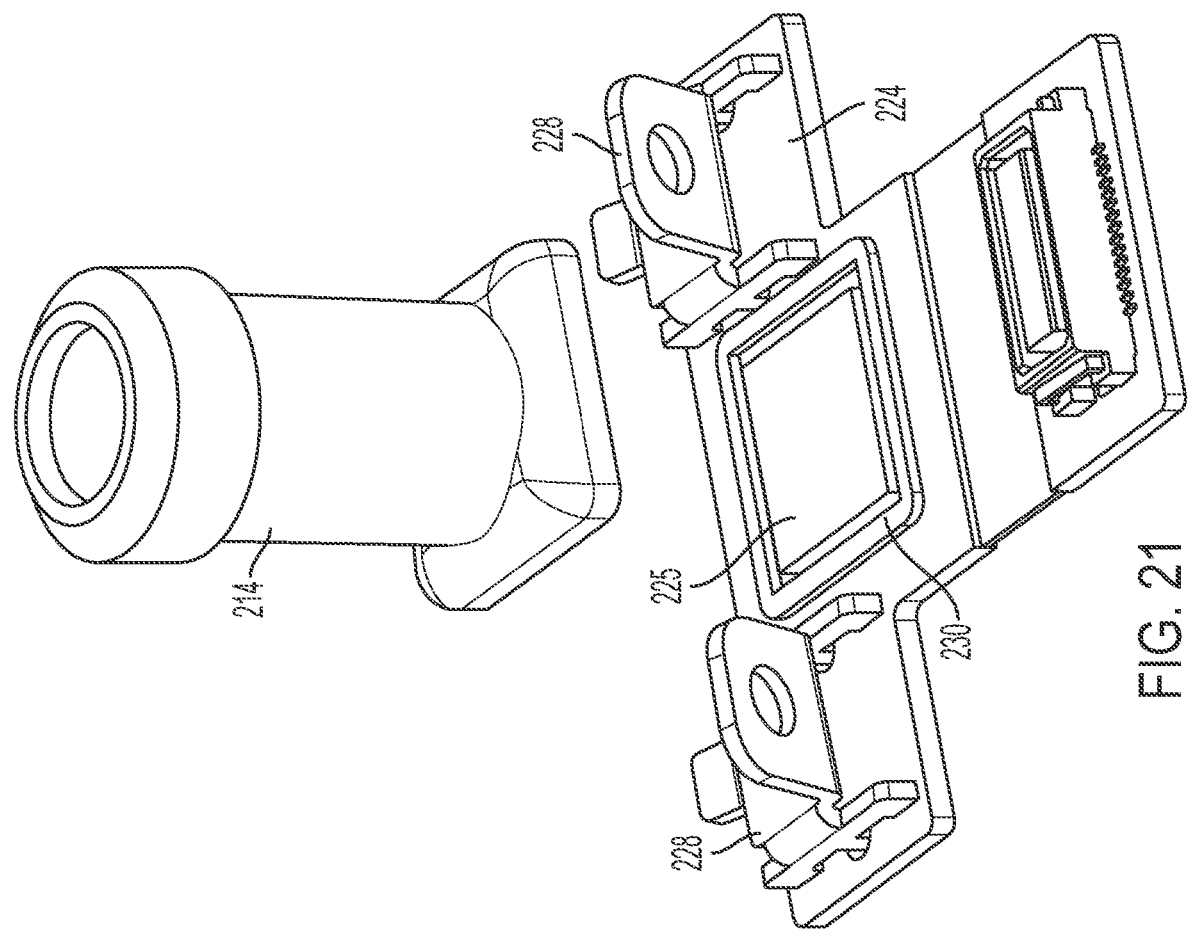
FIG. 21 is another exploded perspective view of the imager assembly, showing an adhesive disposed at the circuit element for attaching the lens at the circuit element.
Figure 22:
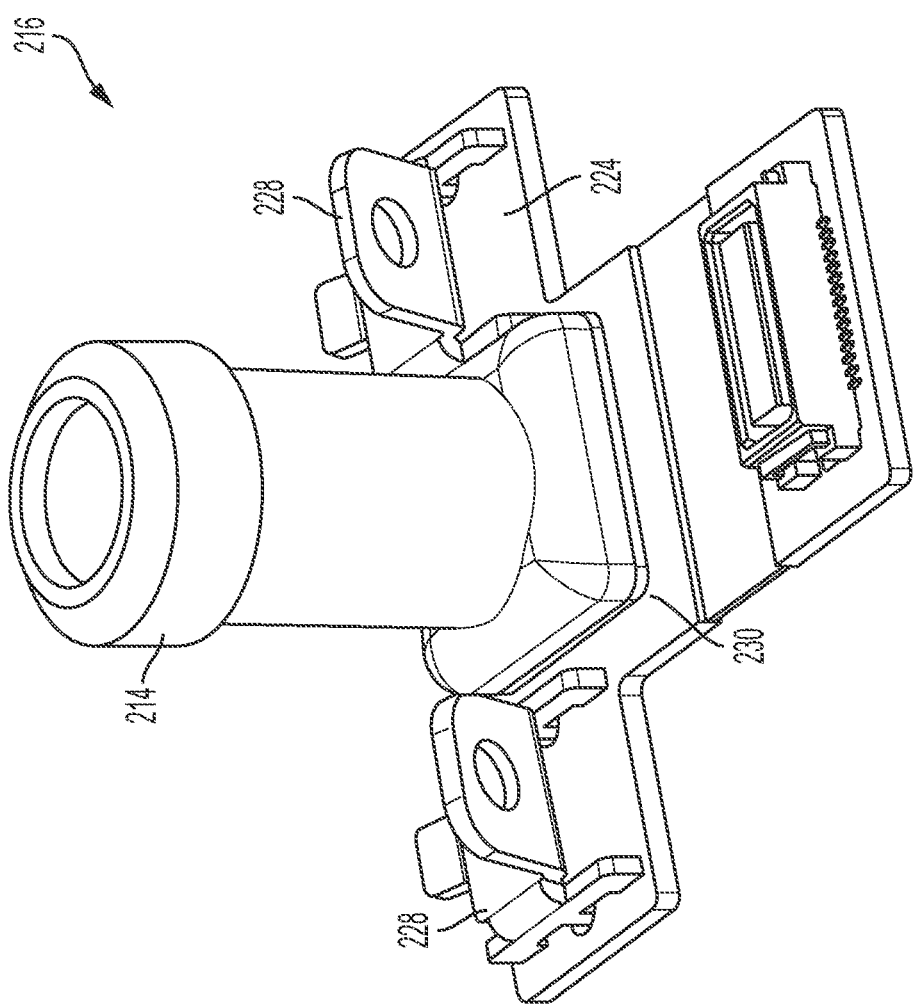
FIG. 22 is a perspective view of the imager assembly of FIG. 21, shown with the lens attached at the adhesive at the circuit element.

As shown in FIGS. 21 and 22, lens 214 is attached (such as via adhesive) to PCB 224 such that the lens is focused and aligned relative to image sensor 225 when the lens is secured relative to the imager PCB. The lens may be attached via any suitable manner, and is preferably adhered or bonded or glued to the surface of the PCB 224 with a UV-curable adhesive. As shown in FIG. 21, an adhesive strip or band or bead 230 may be dispensed at the surface of the PCB 224 and around the imager 225, whereby the lens is then placed at the adhesive and adjusted or set to actively align the lens with the imager. For example, the adhesive may comprise a UV-activated adhesive and the lens may be positioned at the adhesive, whereby the lens is aligned and focused relative to the imager 225 before activating the adhesive to secure the lens relative to the imager and PCB.

The imager assembly of the present invention thus eliminates the need for a plastic lens holder. Instead, two steel clips are soldered or otherwise attached at the imager PCB and serve to attach the imager PCB to the housing of the camera. For example, the tabs 228c, 228d of the clips 228 may attach at or to respective tabs or bosses of the camera housing, such as via a fastener that may insert through the holes 228e in the tabs 228d of the clips 228. The UV-activated adhesive is dispensed directly onto the PCB, and the lens is adhered onto the PCB after it has been activated and aligned.

Optionally, it is envisioned that instead of using adhesive to attach the lens directly onto the PCB, the lens may be attached via piezo-electric elements. For example, the piezo-electric elements may be attached or soldered onto the PCB, whereby the lens may be adhered onto the piezo-electric elements. Using an auto-focus algorithm, a voltage may be applied to the piezo-elements while driving, whereby the piezo-electric elements may adjust the lens relative to the imager and PCB, thereby compensating for any defocusing or misalignment that may occur due to material expansion of the lens or PCB or other camera components that typically occurs with temperature or humidity changes.

Optionally, the forward facing camera may be disposed at or housed at a casing or module (such as at a windshield electronics module or the like) that is configured to attach at an interior or in-cabin surface of a vehicle windshield. Optionally, the module and camera may utilize aspects of the imaging systems and/or modules discussed above or such as described in U.S. Pat. Nos. 8,256,821; 7,946,505; 7,188,963; 7,004,593; 6,824,281; 6,968,736; 6,690,268; 6,250,148; 6,341,523; 6,593,565; 6,428,172; 6,501,387; 6,329,925 and 6,326,613, and/or in U.S. patent application Ser. No. 10/538,724, filed Jun. 13, 2005 and published Mar. 9, 2006 as U.S. Publication No. US-2006-0050018, and/or U.S. patent application Ser. No. 13/258,850, filed Sep. 22, 2011, now U.S. Pat. No. 8,451,332, which are all hereby incorporated herein by reference in their entireties. Optionally, the forward facing camera may be disposed at a module that is spaced from the windshield, such as at or near or part of the interior rearview mirror assembly, or the forward facing camera may be disposed at or in the interior rearview mirror assembly that is attached at an in-cabin portion of the vehicle, while remaining within the spirit and scope of the present invention.

Optionally, the camera module or forward facing imaging (FFI) machine vision camera module may include a stray light shield that may include a light baffling or light trapping structure or configuration or system that limits or reduces extraneous light that passes through a window or windshield of the equipped vehicle from exterior the vehicle from being directly or indirectly imaged by the forward facing camera that is at or near the windshield and that views through the windshield.

Optionally, baffles or light baffling elements of the baffle configuration or structure may be disposed or established at a plate or substrate, which may be disposed at or in the module and may be arranged generally horizontally in front of and below the imaging sensor (or a lens or optical assembly of the imaging sensor or camera), with the baffles extending laterally in a cross car direction in front of the imaging sensor or camera. The baffles or light baffling elements may be generally vertically arranged at the plate or substrate or base of the baffle structure, so that the light baffling elements may be generally vertically oriented when the base of the structure is generally horizontally disposed at the vehicle (with selected angles of the opposite surfaces of the light baffling elements as discussed below).

The camera holder or module (including the camera and housing portion) may be configured to attach to a bracket that is attachable at the in-cabin surface of the vehicle windshield, such as via attachment to one or more attachment elements adhesively attached at the in-cabin surface of the vehicle windshield. The bracket may have an aperture for at least partially receiving and/or aligning with the camera and lens, such that the camera views through the windshield of the vehicle when the camera holder is attached at the bracket that is attached at the windshield. The camera holder and/or the bracket and/or a separate element provides a light shield having a wedge-shaped or tapered recess or pocket at the camera lens, whereby the camera views through the recess or pocket and through the windshield (such as by utilizing aspects of the camera systems described in U.S. Pat. Nos. 8,256,821 and/or 6,824,281, and/or U.S. patent application Ser. No. 13/470,860, filed May 14, 2012, now U.S. Pat. No. 8,405,726, which are hereby incorporated herein by reference in their entireties). The wedge-shaped recess or pocket may be defined or formed by a base portion and opposite sidewalls that taper towards the lens and that extend generally upwards from the base portion to form the wedge-shaped recess or pocket between the in-cabin surface of the windshield and the base portion.

Because of the number of components established at the main circuit board of the camera module, it is desirable to have the main circuit board comprise a double sided PCB with circuitry and components established at both sides of the circuit board. The flexible connector or cable provides LVDS signals conveying image data captured by the imager to the image processor of the main circuit board. Alternately, image data captured by the imager may be conveyed to the image processor via the likes of Ethernet or by the protocols described in U.S. Pat. No. 7,697,027, which is hereby incorporated herein by reference in its entirety. The aperture or opening or hole in the main circuit board provides for passage of the flexible connector through the circuit board so as to establish electrical connection to the opposite side of the main circuit board, and the aperture or opening or hole in the main circuit board also at least partially receives a portion of imager assembly (such as a portion of the imager circuit board and/or imager and/or lens holder and/or lens) to provide a lower profile camera system or module.

Optionally, the camera module may include ventilation means for ventilating the module at the windshield (such as by utilizing aspects of the modules described in U.S. patent application Ser. No. 11/721,406, filed Jun. 11, 2007 and published Dec. 3, 2009 as U.S. Publication No. US-2009-0295181, and/or U.S. patent application Ser. No. 12/393,223, filed Feb. 26, 2009, now abandoned, which are hereby incorporated herein by reference in their entireties).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/248,602, filed Apr. 9, 2014, now U.S. Pat. No. 9,327,693; Ser. No. 14/242,038, filed Apr. 1, 2014, now U.S. Pat. No. 9,487,459; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published Aug. 7, 2014 as U.S. Patent Publication No. US-2014/0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, which published Sep. 4, 2014 as U.S. Patent Publication No. US-2014/0247352; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Patent Publication No. 2014/0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Patent Publication No. 2014/0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Patent Publication No. US-2014/0168437; Ser. No. 14/098,817, filed Dec. 6, 2013, and published Jun. 19, 2014 as U.S. Patent Publication No. US-2014/0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published Jan. 23, 2014 as U.S. Patent Publication No. US-2014/0025240; Ser. No. 13/942,753, filed Jul. 16, 2013, and published Jan. 30, 2014 as U.S. Patent Publication No. US-2014/0028852; Ser. No. 13/927,680, filed Jun. 26, 2013, and published Jan. 2, 2014 as U.S. Patent Publication No. US-2014/0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, and published Aug. 29, 2013 as U.S. Patent Publication No. US 2013/0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Patent Publication No. US-2013/0278769; Ser. No. 13/847,815, filed Mar. 20, 2013, and published Oct. 31, 2013 as U.S. Patent Publication No. US-2013/0286193; Ser. No. 13/800,697, filed Mar. 13, 2013, and published Oct. 3, 2013 as U.S. Patent Publication No. US-2013/0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No.

13/774,315, filed Feb. 22, 2013, and published Aug. 22, 2013 as U.S. Patent Publication No. US-2013/0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Patent Publication No. US-2013/0002873, and/or U.S. provisional applications, Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10,2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; and/or Ser. No. 61/813,361, filed Apr. 18, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Patent Publication No. US-2013/0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A method for assembling a camera module for a vehicular vision system, the assembled camera module configured to mount at a receiving structure at an in-cabin surface of a vehicle windshield of a vehicle equipped with the vehicular vision system, said method comprising:

providing an imager circuit board, wherein the imager circuit board has a first side and a second side opposite the first side and separated from the first side by a thickness dimension of the imager circuit board, and wherein an imager is disposed at the first side of the imager circuit board;

providing a lens holder, wherein the lens holder comprises (i) a lens holding portion that accommodates a lens and (ii) an attaching portion, and wherein the attaching portion of the lens holder comprises a mating surface that faces away from the lens holding portion of the lens holder, and wherein the attaching portion comprises at least two pins extending from the mating surface of the attaching portion;

locating the lens holder at the imager circuit board by inserting individual pins of the at least two pins at least partially through respective apertures of the imager circuit board to surface mount the attaching portion of the lens holder at the first side of the imager circuit board, wherein the apertures of the imager circuit board have a greater cross dimension than a corresponding cross dimension of the individual pins;

with the individual pins received at least partially through the respective apertures of the imager circuit board, laterally adjusting the lens holder relative to the imager circuit board to optically align the lens with the imager at the imager circuit board;

with the individual pins received at least partially through the respective apertures of the imager circuit board, and with the lens optically aligned and focused with the imager at the imager circuit board, soldering the at least two pins at the imager circuit board so as to fixedly attach the lens holder at the imager circuit board to form an imager assembly;

attaching the imager assembly at a camera housing;

accommodating a processing circuit board at the camera housing; and electrically connecting circuitry of the imager circuit board to circuitry of the processing circuit board via a flexible electrical connector.

2. The method of claim 1, wherein attaching the imager assembly at the camera housing comprises attaching the imager assembly at an upper housing portion of the camera housing with the lens holder disposed at an aperture through the upper housing portion of the camera housing.

3. The method of claim 2, wherein accommodating the processing circuit board at the camera housing comprises attaching the processing circuit board at a lower housing portion of the camera housing.

4. The method of claim 3, comprising, after attaching the imager assembly at the camera housing and electrically connecting circuitry of the imager circuit board to circuitry of the processing circuit board, attaching the lower housing portion to the upper housing portion.

5. The method of claim 1, wherein providing the lens holder comprises molding a plastic lens holder with the at least two pins insert molded at the attaching portion of the lens holder so as to protrude from the attaching portion of the lens holder.

6. The method of claim 1, wherein soldering the at least two pins at the imager circuit board comprises soldering the at least two pins at the second side of the imager circuit board.

7. The method of claim 1, comprising soldering circuitry at the imager circuit board, wherein soldering circuitry at the imager circuit board and soldering the at least two pins at the imager circuit board are performed via a common soldering process.

8. The method of claim 7, wherein the common soldering process comprises applying and curing solder that affixes the at least two pins at the imager circuit board and that affixes the circuitry at the imager circuit board.

9. The method of claim 1, wherein the lens holding portion of the lens holder comprises a cylindrical lens barrel that accommodates the lens.

10. The method of claim 9, wherein the attaching portion of the lens holder comprises a rectangular portion having the at least two pins disposed along and protruding from at least one side region of the attaching portion.

11. The method of claim 10, wherein the at least two pins comprise at least three pins linearly disposed along the at least one side region of the attaching portion.

12. A method for assembling a camera module for a vehicular vision system, the assembled camera module configured to mount at a receiving structure at an in-cabin surface of a vehicle windshield of a vehicle equipped with the vehicular vision system, said method comprising:

providing an imager circuit board, wherein the imager circuit board has a first side and a second side opposite the first side and separated from the first side by a thickness dimension of the imager circuit board, and wherein an imager is disposed at the first side of the imager circuit board;

providing a lens holder, wherein the lens holder comprises (i) a lens holding portion that accommodates a lens and (ii) an attaching portion, and wherein the attaching portion of the lens holder comprises a mating surface that faces away from the lens holding portion of the lens holder, and wherein the attaching portion comprises at least two pins extending from the mating surface of the attaching portion;

locating the lens holder at the imager circuit board by inserting individual pins of the at least two pins at least partially through respective apertures of the imager circuit board to surface mount the attaching portion of the lens holder at the first side of the imager circuit board, wherein the apertures of the imager circuit board have a greater cross dimension than a corresponding cross dimension of the individual pins;

with the individual pins received at least partially through the respective apertures of the imager circuit board, laterally adjusting the lens holder relative to the imager circuit board to optically align the lens with the imager at the imager circuit board;

with the individual pins received at least partially through the respective apertures of the imager circuit board, and with the lens optically aligned and focused with the imager at the imager circuit board, soldering the at least two pins at the second side of the imager circuit board so as to fixedly attach the lens holder at the imager circuit board to form an imager assembly;

attaching the imager assembly at an upper housing portion of a camera housing with the lens holder disposed at an aperture through the upper housing portion of the camera housing;

attaching a processing circuit board at a lower housing portion of the camera housing;

electrically connecting circuitry of the imager circuit board to circuitry of the processing circuit board; and after attaching the imager assembly at the camera housing and electrically connecting circuitry of the imager circuit board to circuitry of the processing circuit board, attaching the lower housing portion to the upper housing portion.

13. The method of claim 12, wherein providing the lens holder comprises molding a plastic lens holder with the at least two pins insert molded at the attaching portion of the lens holder so as to protrude from the attaching portion of the lens holder.

14. The method of claim 12, comprising soldering circuitry at the imager circuit board, wherein soldering circuitry at the imager circuit board and soldering the at least two pins at the imager circuit board are performed via a common soldering process.

15. The method of claim 12, wherein the lens holding portion of the lens holder comprises a cylindrical lens barrel that accommodates the lens.

16. The method of claim 15, wherein the attaching portion of the lens holder comprises a rectangular portion having the at least two pins disposed along and protruding from at least one side region of the attaching portion.

17. A method for assembling a camera module for a vehicular vision system, the assembled camera module configured to mount at a receiving structure at an in-cabin surface of a vehicle windshield of a vehicle equipped with the vehicular vision system, said method comprising:
- providing an imager circuit board, wherein the imager circuit board has a first side and a second side opposite the first side and separated from the first side by a thickness dimension of the imager circuit board, and wherein an imager is disposed at the first side of the imager circuit board;
- providing a lens holder, wherein the lens holder comprises (i) a lens holding portion comprising a cylindrical lens barrel that accommodates a lens and (ii) an attaching portion, and wherein the attaching portion of the lens holder comprises a mating surface that faces away from the lens holding portion of the lens holder, and wherein the attaching portion comprises at least two pins extending from the mating surface of the attaching portion;
- wherein providing the lens holder comprises plastic molding of the lens holder with the at least two pins insert molded at the attaching portion of the lens holder so as to protrude from the attaching portion of the lens holder;
- locating the lens holder at the imager circuit board by inserting individual pins of the at least two pins at least partially through respective apertures of the imager circuit board to surface mount the attaching portion of the lens holder at the first side of the imager circuit board, wherein the apertures of the imager circuit board have a greater cross dimension than a corresponding cross dimension of the individual pins;
- with the individual pins received at least partially through the respective apertures of the imager circuit board, laterally adjusting the lens holder relative to the imager circuit board to optically align the lens with the imager at the imager circuit board;
- with the individual pins received at least partially through the respective apertures of the imager circuit board, and with the lens optically aligned and focused with the imager at the imager circuit board, soldering the at least two pins at the imager circuit board so as to fixedly attach the lens holder at the imager circuit board to form an imager assembly;
- attaching the imager assembly at a camera housing;
- accommodating a processing circuit board at the camera housing; and
- electrically connecting circuitry of the imager circuit board to circuitry of the processing circuit board via a flexible electrical connector.

18. The method of claim 17, wherein attaching the imager assembly at the camera housing comprises attaching the imager assembly at an upper housing portion of the camera housing with the lens holder disposed at an aperture through the upper housing portion of the camera housing, and wherein accommodating the processing circuit board at the camera housing comprises attaching the processing circuit board at a lower housing portion of the camera housing, and wherein said method comprises, after attaching the imager assembly at the camera housing and electrically connecting circuitry of the imager circuit board to circuitry of the processing circuit board, attaching the lower housing portion to the upper housing portion.

19. The method of claim 17, comprising soldering circuitry at the imager circuit board, wherein soldering circuitry at the imager circuit board and soldering the at least two pins at the imager circuit board are performed via a common soldering process.

20. The method of claim 17, wherein the attaching portion of the lens holder comprises a rectangular portion having the at least two pins disposed along and protruding from at least one side region of the attaching portion.

* * * * *